April 22, 1941.    H. A. TENN    2,239,632
MACHINE SYNCHRONIZER
Filed April 16, 1940    3 Sheets-Sheet 1

Inventor
Harold A. Tenn
By H. Q. Willeson & Co
Attorneys

WITNESS
H. Woodard

April 22, 1941.   H. A. TENN   2,239,632
MACHINE SYNCHRONIZER
Filed April 16, 1940   3 Sheets-Sheet 2

Harold A. Tenn

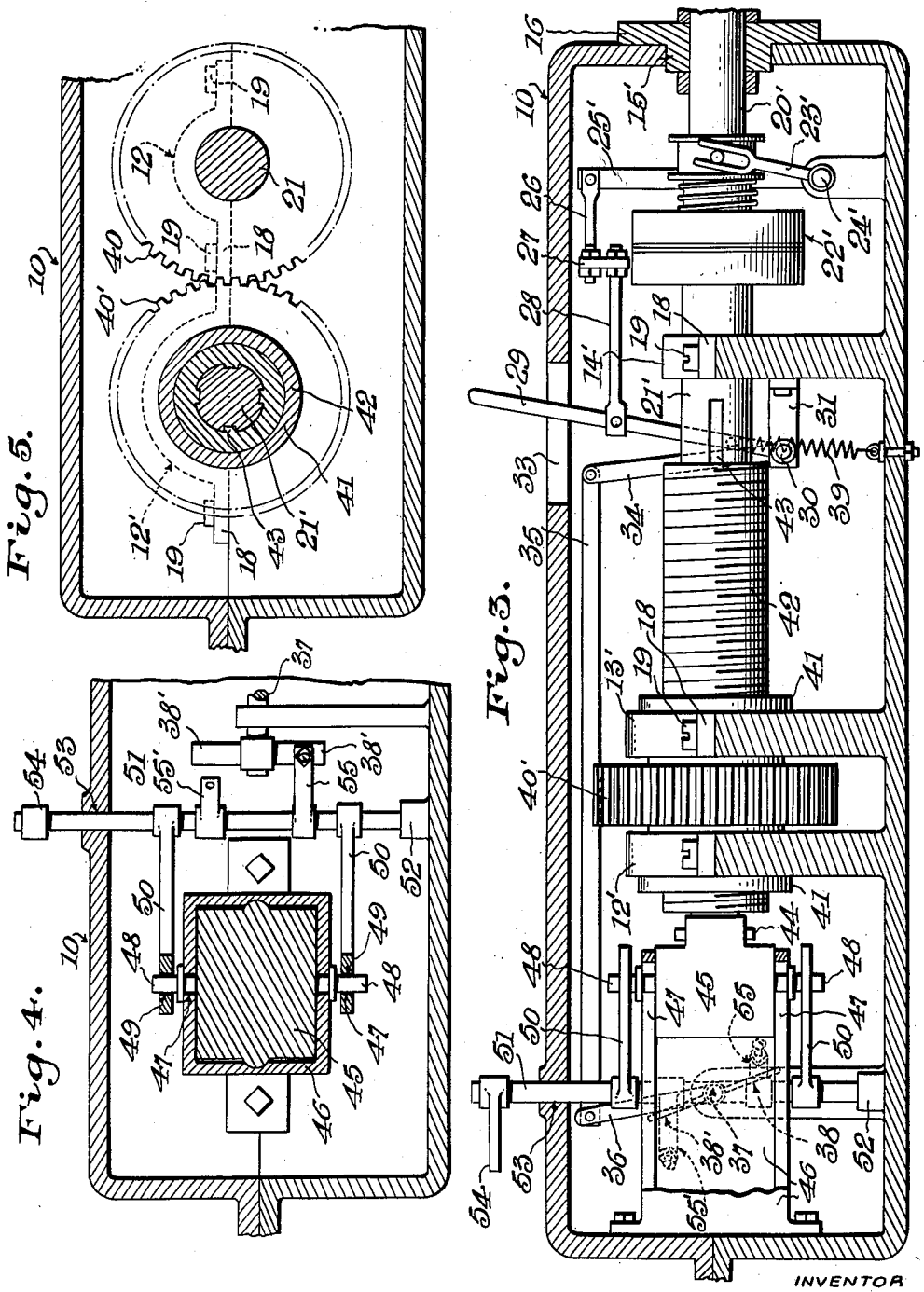

Patented Apr. 22, 1941

2,239,632

UNITED STATES PATENT OFFICE 2,239,632

MACHINE SYNCHRONIZER

Harold A. Tenn, Honolulu, Territory of Hawaii

Application April 16, 1940, Serial No. 329,996

4 Claims. (Cl. 60—97)

The invention aims to provide a new and improved device for synchronizing the speeds of two or more machines, said device being intended principally for use in obtaining uniform speeds for aircraft propellers or boat propellers, for preventing propeller racing on plural-propeller ships in rough water with one propeller or another often partly out of the water, etc.

In carrying out the above end, a further object is to make novel provision for automatically disconnecting the synchronizer from the machines which it normally synchronizes, in case it functions in an endeavor to rectify speed discrepancy but cannot accomplish that end due to some failure of one of the machines, thereby preventing injury to the synchronizing mechanism, which might otherwise be inevitable.

With the foregoing and minor objects in view, the invention resides in the novel subject matter hereinafter described and claimed, description being accomplished by reference to the accompanying drawings.

Figs. 3, 4 and 5 are vertical sectional views on the correspondingly numbered lines of Fig. 2.

Figure 1:
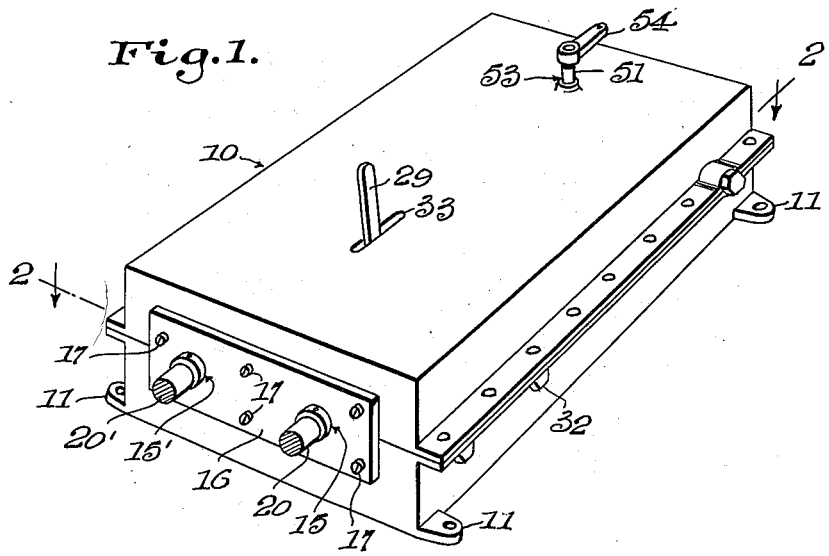
Fig. 1 is a perspective view of the synchronizer.
Figure 6:
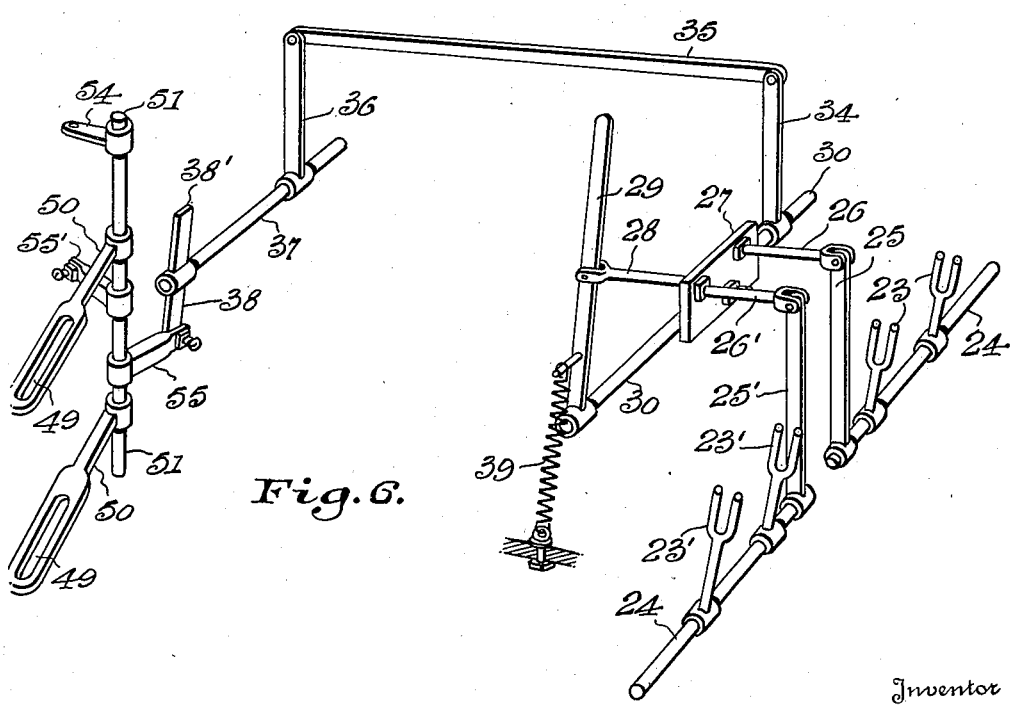
Fig. 6 is a perspective view of a number of the internal movable parts, which are operable to automatically disconnect the synchronizer from the machines in case said synchronizer acts but cannot bring said machines into step.
Figure 2:
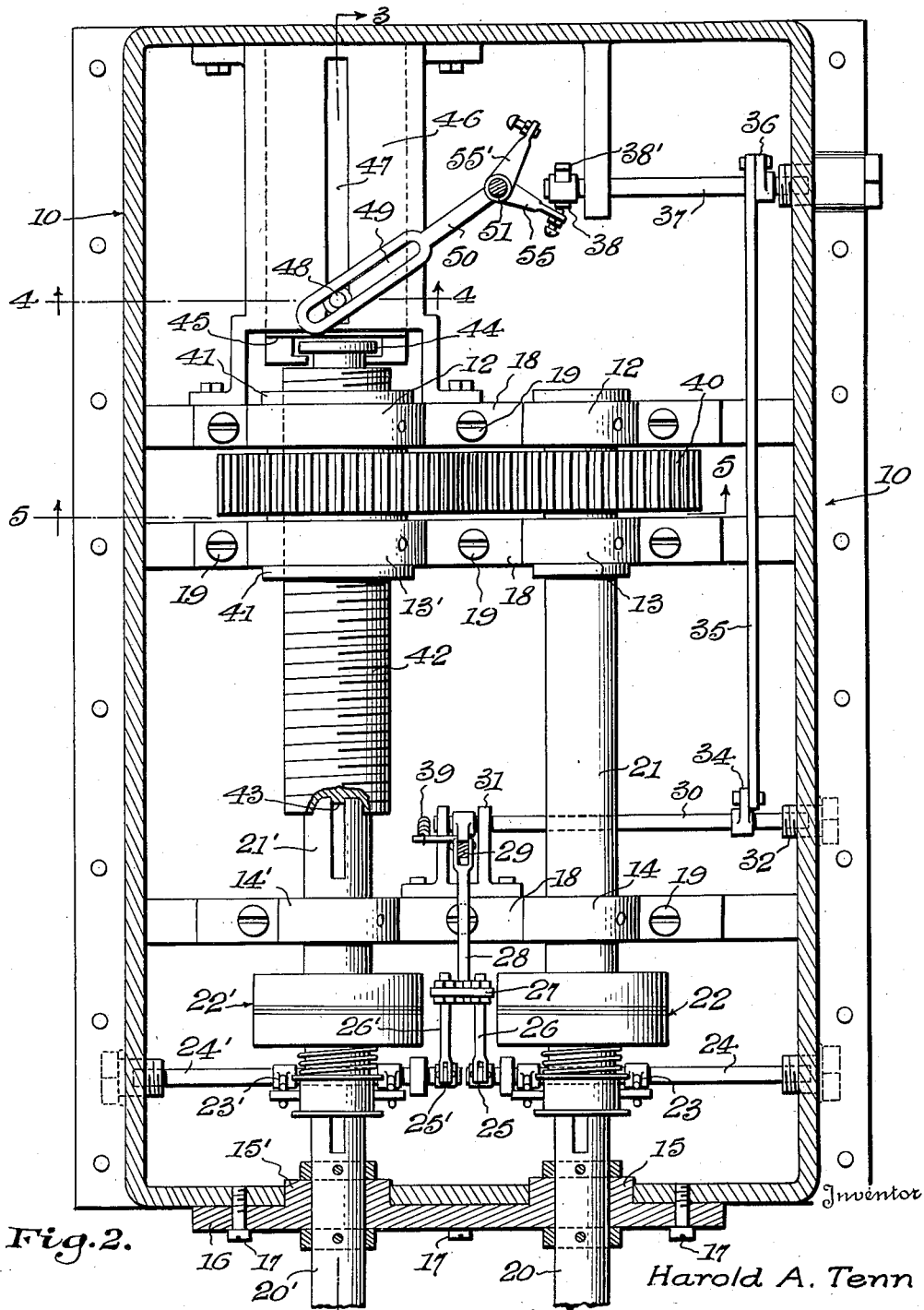
Fig. 2 is a horizontal sectional view on line 2—2 of Fig. 1.

In the drawings above briefly described, preferred features of construction have been illustrated, and while that construction will be rather specifically explained, it is to be understood that variations may be made within the scope of the invention as claimed.

A suitable casing 10 is shown having lugs or the like 11 for mounting it upon any desired support. This casing is provided with one row of bearings 12, 13, 14 and 15 and with another row of corresponding bearings 12', 13', 14', and 15', the bearings 15 and 15' being preferably carried by a plate 16 secured to one end of the casing 10 by screws or the like 17. The other bearings all preferably include removable sections 18 secured in place by screws or the like 19.

Rotatably mounted in the bearing 15 is a shaft 20 which is operatively connected to one machine whose speed may be manually or otherwise controlled, and mounted in the bearing 15' is another shaft 20' to be driven by another machine which is to be synchronized with the machine connected with shaft 20. Alined with the shaft 20 and mounted in the bearings 12, 13 and 14, is a shaft 21 to be driven by said shaft 20 by means of a severable driving connection such as a clutch 22; and still another shaft 21' in alinement with the shaft 20', is rotatably supported in the bearing 14' and is connectable with said shaft 20' by another severable connection such as a clutch 22'. Clutch throw-out forks 23 and 23' are provided for clutches 22 and 22', said forks being secured to rock shafts 24 and 24' respectively, which rock shafts are provided with crank arms 25 and 25' connected at 26 and 26' with a head 27 on a rod 28, this rod being pivoted to a lever 29 on a rock shaft 30 mounted in the casing 10 by means of suitable bearings 31 and 32. The lever 29 extends to the exterior of the casing 10 through a slot 33 and is thus manually operable to actuate the clutches 22 and 22', but provision is made for also automatically operating said lever, as will hereinafter appear. In the present showing, the shaft 30 is provided with a crank arm 34 connected by a rod 35 with another crank arm 36 on a rock shaft 37, whereby turning of this rock shaft 37 in one direction will simultaneously throw out the clutches 22 and 22'. One end of the shaft 37 is provided with two arms 38 and 38' which project in opposite directions therefrom and are instrumental in turning said shaft in clutch throw-out direction. The various clutch-operating parts may be normally held in clutch-in position by a spring 39 connected with the lever 29, or in any other preferred manner, and spring 39 may also act to hold the clutches out when they are thrown out.

One spur gear 40 is secured upon the shaft 21 of the bearings 12 and 13 and another gear 40' of the same size, meshes with said gear 40, said gear 40' having hubs 41 rotatably mounted in the bearings 12' and 13'. Threaded through the gear 40' is a sleeve 42 which is splined at 43 or otherwise slidably mounted on the shaft 21'. As long as the shaft 21' rotates at the same speed as shaft 21 and gear 40', sleeve 42 will turn unitarily with said gear 40'. However, if the speed of shaft 21' increases or decreases with respect to shaft 21, the sleeve 42 and gear 40' will be relatively turned, causing said sleeve to thread in one direction or the other through said gear 40'. This longitudinal movement of the sleeve 42 is utilized to regulate the speed of shaft 21' to restore it into synchronized rotation with the shaft 21.

In the present disclosure, one end of the sleeve 42 is swiveled at 44 to a block 45 which is slidable in and non-rotatably guided by a suitable guide member 46 secured in the casing 10. Opposite sides of this guide member are formed with longitudinal slots 47 through which pins or the like 48 on the block 45 project, said pins being received in slots 49 of two arms 50 which are secured on a rock shaft 51, said rock shaft being disposed near the rock shaft 37 and at right angles thereto. I have shown a suitable bearing 52 for the lower end of shaft 51, and the upper end of said shaft passes through an opening 53 in the top of the casing 10, and is provided with an arm 54 for connection with the speed-controlling means of the machine which drives the shaft 20'. When shaft 21' decreases in speed with respect to shaft 21, sleeve 42 moves block 45 in one direction and thus operates the arms 50 and rock shaft 51 to swing the speed-controlling arm 54 in one direction. When shaft 21', however, travels faster than shaft 21, sleeve 42 moves block 45 in the opposite direction and thus causes the parts 50 and 51 to swing the arm 54 in the opposite direction, and these movements of arm 54 are utilized (through suitable operating connections, not shown) to restore the proper speed to the machine connected with shaft 20'.

On the rock shaft 51, at opposite sides of the axis of the rock shaft 37, are two arms 55 and 55' which are spaced apart circumferentially of said shaft 51. These two arms 55 and 55' are cooperable with the arms 38 and 38' of the shaft 37, 55 being at one side of 38 and 55' at the opposite side of 38'. The arms 55 and 55' are so spaced that during normal operation of the synchronizing mechanism, neither of these arms comes in contact with the respective arm 38 or 38' of the rock shaft 37. However, should the block 45 be moved an abnormal distance in either direction before the shaft 21' becomes synchronized with shaft 21, one or the other of the arms 55, 55', will engage the coacting arm 38, 38' and will rock the shaft 37, thus operating the rod 35, arm 34, rock shaft 30, lever 29, etc. to throw out both clutches 22 and 22'. The synchronizing mechanism is thus disconnected from the machines which it synchronizes, in case it should fail to produce synchronization of said machines due to any cause, such as failure of one of the machines. Thus, danger of injuring any parts of the synchronizing mechanism, which would be otherwise inevitable or highly probable, is prevented, even should one machine or the other entirely stop. An effective safeguard is thus provided for disconnecting the synchronizer from the synchronized machines, in case it endeavors to bring the two machines into synchronization after slight deviation therefrom, but is unable to produce that end.

Excellent results may be obtained from the general construction shown and described and it may, therefore, be followed. However, within the scope of the invention as claimed, variations may be made as above stated.

While the invention has been described for synchronizing only two machines, it could of course be constructed to synchronize any desired number by duplicating the parts associated with the shaft 21', and this shaft, once for each machine other than the controlling machine which drives the shaft 21. When the invention is to be used to prevent propeller race on larger ships traveling in rough seas, the "key motor" or motor-driving shaft 21, may be a small gas engine or an electric motor having a set speed, and other suitable changes will have to be made to adapt the entire mechanism for slow speed operation.

I claim:

1. In a machine synchronizer, one member and a clutch for connecting it with one machine, a second member and a clutch for connecting it with a second machine, machine speed regulating means actuated by relative rotation of said members for regulating the speed of the second machine-driven member according to the speed of the first, and clutch throw-out means operable upon abnormal relative rotation of said members in one direction and also operable by abnormal relative rotation of said members in the other direction for automatically disengaging both of said clutches simultaneously.

2. In a machine synchronizer, one member and a clutch for connecting it with one machine, a second member and a clutch for connecting it with a second machine, machine speed regulating means actuated by relative rotation of said members for regulating the speed of the second machine-driven member according to the speed of the first, and clutch throw-out means operable by abnormal speed-increasing action of said regulating means and also operable by abnormal speed-decreasing action of said regulating means for automatically disengaging both of said clutches simultaneously.

3. In a machine synchronizer, machine speed regulating means including a member movable in one direction to increase machine speed and in the other direction to decrease machine speed, severable driving means for said regulating means, severing means for said driving means including a second member movable in one direction to sever said driving means, and coacting means on said members for moving said second member in said one direction when the first mentioned member is moved an abnormal distance in either speed-increasing or speed-decreasing direction.

4. In a machine synchronizer, machine speed regulating means including a rock shaft turnable in one direction to increase machine speed and in the other direction to decrease machine speed, severable driving means for said speed-regulating means, severing means for said driving means including a pivoted operating member turnable in one direction to sever said driving means, said operating member being near said rock shaft and having its pivotal axis disposed at right angles to said rock shaft, two arms on said rock shaft spaced apart both longitudinally and circumferentially thereof and disposed at opposite sides of said pivotal axis of said operating member, two additional arms on said operating member projecting in opposite directions from its pivotal axis and extending longitudinally of said rock shaft, one of said additional arms being disposed in the path on which one of the rock shaft arms moves during speed-increasing movement of said regulating means, the other of said additional arms being disposed in the path on which the other of the rock shaft arms moves during speed-decreasing movement of said regulating means, said additional arms being disposed near the ends of said paths to be struck and operated by said rock shaft arms only when the latter are moved an abnormal distance.

HAROLD A. TENN.